United States Patent [19]

Zievers et al.

[11] Patent Number: 4,865,629
[45] Date of Patent: Sep. 12, 1989

[54] CONTROL OF PARTICLE SIZE DISTRIBUTION IN GAS FILTRATION

[75] Inventors: James F. Zievers, LaGrange; Paul Eggerstedt, North Riverside, both of Ill.

[73] Assignee: Industrial Filter & Pump Mfg. Co., Cicero, Ill.

[21] Appl. No.: 215,405

[22] Filed: Jul. 5, 1988

[51] Int. Cl.$^4$ .................. B01D 45/16; B01D 46/04
[52] U.S. Cl. .................................. 55/97; 55/1; 55/262; 55/265; 55/302; 55/337; 55/338; 55/345
[58] Field of Search ................. 55/1, 96, 97, 262, 265, 55/266, 302, 337, 338, 345, 431, 459.1, DIG. 25

[56] References Cited

U.S. PATENT DOCUMENTS

| | | | |
|---|---|---|---|
| 2,236,548 | 4/1941 | Prouty | 55/345 X |
| 2,276,805 | 3/1942 | Tolman, Jr. | 55/302 X |
| 2,717,658 | 9/1955 | Bethea et al. | 55/97 |
| 2,771,158 | 11/1956 | Bray et al. | 55/97 |
| 2,880,819 | 4/1959 | King et al. | 55/338 X |
| 2,966,232 | 12/1960 | Austin | 55/97 X |
| 3,146,080 | 8/1964 | Ruble et al. | 55/96 |
| 3,318,070 | 5/1967 | Zeiss et al. | 55/262 X |
| 3,328,131 | 6/1967 | Latham, Jr. | 55/DIG. 25 |
| 3,473,300 | 10/1969 | Wilm et al. | 55/302 |
| 3,646,595 | 2/1972 | Williams | 55/302 X |
| 3,798,877 | 3/1974 | Lamb | 55/97 X |
| 3,892,543 | 7/1975 | Margraf | 55/96 |
| 4,169,714 | 10/1979 | Calvert | 55/337 X |
| 4,260,399 | 4/1981 | Kawasaki | 55/96 X |
| 4,521,226 | 6/1985 | Alig et al. | 55/97 X |

FOREIGN PATENT DOCUMENTS 3202240  7/1983  Fed. Rep. of Germany ........ 55/337

*Primary Examiner*—Robert Spitzer
*Attorney, Agent, or Firm*—Edmond T. Patnaude

[57] ABSTRACT

A process for filtering fine particulates from a stream of hot gas wherein the particulates vary in size between about 0.15 and 250 microns includes the steps of removing a majority of the larger size particles from the gas stream, while leaving a majority of the smaller particles in the stream, then introducing into the gas stream particulates having an average size greater than the smaller size particulates, and thereafter passing the gas stream through a porous filter medium having a pore size exceeding the size of the smaller size particulates.

4 Claims, 1 Drawing Sheet

CONTROL OF PARTICLE SIZE DISTRIBUTION IN GAS FILTRATION

The present invention relates in general to the filtration of hot gasses, and it relates more particularly to a method and apparatus for more efficiently filtering hot gasses which are contaminated with a high fraction of extremely fine particulates.

BACKGROUND OF THE INVENTION

In the filtration of gasses or liquids the pore size of the filter media used is typically proportional to the size of the particulates to be removed. Since the differential pressure across the filter media is inversely proportional to the pore size, cycle times increase inversely with the pore size of the filter media and the energy expended also increases as the pore size of the filter media is decreased. As a consequence, shorter cycle times and subsequently increased energy use have been required in the filtration of gasses contaminated with very fine particulates.

The filtration of hot gasses in which very fine particulates are entrained has been carried out with the use of porous ceramic filter tubes having a relatively coarse supporting matrix portion over which there is a relatively thin filter layer of a very fine porous ceramic. Even with such filters the filter cake which builds up on the surface of the fine filter layer decreases the operating cycle by increasing the pressure drop across the filter. If there is a relatively great amount of particulate in the gas the resultant filter cakes can damage the filter by filling the space between adjacent filter tubes. Moreover, the very fine particles penetrate the interstices in the filter layer and irreversibly plug or foul the filter element.

In order to alleviate the problems inherent with the filtration of the fine particulates and thus to increase the efficiency of the system, one or more centrifugal separators or cyclones have been connected in the system upstream of the filter to remove the majority of the particulate contaminant mass from the gas stream prior to the final filtration or polishing operation.

We have found that the particulates in the gas stream exiting the cyclones sometimes have an abnormally small particle size distribution, i.e., they have an unusually high fraction of very fine solids in the range of 0.15 to 1.9 microns. If a filter media having a pore size small enough to remove these very fine particulates is used, the pressure drop across the filter becomes excessive for the efficient operation of the system. In the alternative, if a filter media having a mean pore size which is suitable for use with a normal particle size distribution is used, wherefore the pressure drop is not excessive, these very fine particles pass into the interstices of the filter media where they become permanently lodged so that in a relatively short time the filter media must be replaced. We have found a solution to this problem.

SUMMARY OF THE INVENTION

By blending a fraction of the particles removed by the cyclones back into the gas stream at a location downstream of the cyclones and upstream of the filter the very fine particles are filtered out of the gas with a minimum of plugging or fouling of the filter media. We believe that this improved operation results from the more nearly normal particle size distribution of the gas entering the filter wherefore the very fine particles are trapped in the filter cake before reaching the filter media itself.

In those cases where chemical treatment of the gas vapors is required, such for example, as in the removal of sodium, potassium and sulphur vapors, reactive particles of selected sizes may be blended into the gas stream to replace some of the larger particles previously removed by the cyclones. In this way, the added particles serve the dual purposes of one, reacting with the gas vapors and two, mechanically assisting in the removal of the fine contaminent particles from the gas stream. Examples of reactive materials used for this purpose are diatomite and bauxite to remove Na/K vapors and powdered lime and zinc ferrite to remove sulfur vapor.

GENERAL DESCRIPTION OF THE DRAWING

Further objects and advantages and a better understanding of the present invention will be had by reference to the following detailed description taken in connection with the accompanying drawing wherein.

DETAILED DESCRIPTION OF A PREFERRED EMBODIMENT OF THE INVENTION

Figure 1:
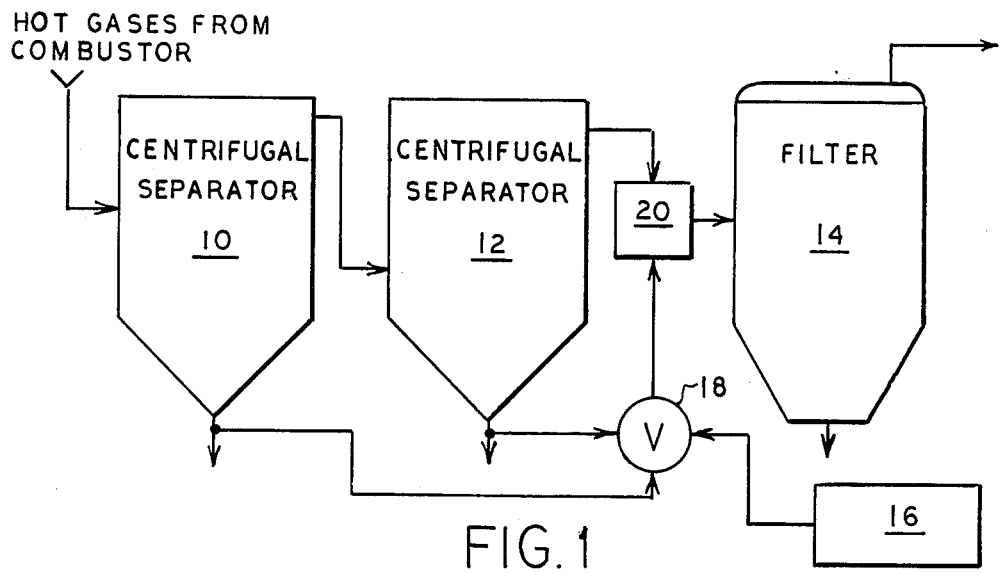
FIG. 1 is a schematic block diagram of a particle separation system embodying the present invention.

Referring to FIG. 1, the hot gasses from a combustor (not shown) are passed through a centrifugal separator 10 to remove a portion of the particulates which are entrained in the gas. The removed particles are collected at the bottom of the separator 10 while the purified gas is exhausted near the top. Depending on the nature of the fuel being burned and the efficiency of the combustor, i.e. the total weight of the particulates, as well as the requirements of the system, a second centrifugal separator may be used. In which case the gaseous output from the separator 10 is passed through a second centrifugal separator 12 before entering a pressure filter 14 where very fine entrained particles which were not removed by the centrifugal separators 10 and 12 are removed before the highly purified hot gas exits from the upper portion of the filter 14. Preferably the filter 14 is of the type comprising a plurality of multi-layer, tubular ceramic filter elements which are periodically cleaned by high pressure bursts of gas applied in a reverse direction to the downstream surfaces of the filter elements. The principal advantage of a cleaning system of that type is that the filter is continuously operated, i.e., it is not taken off stream during the cleaning cycles. Frequent pulsing is also disadvantageous since it cools effluent gas and dilutes effluent gas with nitrogen or other gas used for pulse cleaning. Nevertheless, a substantial amount of energy must be expended during each cleaning cycle, wherefore it is still important to minimize the required number of cleaning cycles while at the same time maintaining the pressure drop across the filter sufficiently low so as to keep the overall efficiency of the filter within acceptable limits.

Centrifugal separators or cyclones as they are sometimes called are relatively efficient particle removers and are suitable for use with hot gasses having temperatures as high as 2,000° F., or greater. Centrifugal separators commonly have an operating efficiency of between sixty and ninety percent, i.e., at ninety percent efficiency ninety percent by weight of the solids are removed with ten percent remaining in the treated gas. Therefore, the use of one or more centrifugal separators to pre-clean the hot gas before it reaches the ceramic filter elements in the filter 14 greatly reduces the load on the filter and thus theoretically increases the length of the filtration periods between the cleaning periods with a consequent theoretical increase in efficiency.

We have found that the improvement in the operating efficiency of the filter resulting from the addition of multiple centrifugal separators can be less than expected. Indeed, the filter elements can become plugged more quickly than is the case where the multiple centrifugal separators are not used, and in addition, the useful lives of the filter elements can be reduced because of the increase in the number of particulates lodged in the interstices of the filter elements.

In accordance with one aspect of the present invention a fraction of the solids collected at the bottoms of one or both of the separators 10 and 12 are blended into the gas entering the filter 14, and as a result, the operating efficiency of the filter is greatly increased in that the pressure differential across the filter decreases and plugging or fouling of the filter elements is substantially reduced. No additional gas or other particulates need be used to achieve this improved result.

Figure 2:
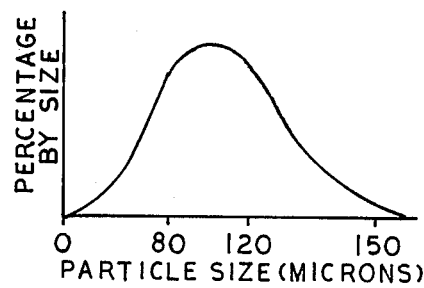
FIG. 2 is a graph showing a normal particle size distribution curve in combustion gasses exhausted from a coal fired combustor which is amenable to efficient filtration. It may typically represent the effluent of one preceding cyclone.
Figure 3:
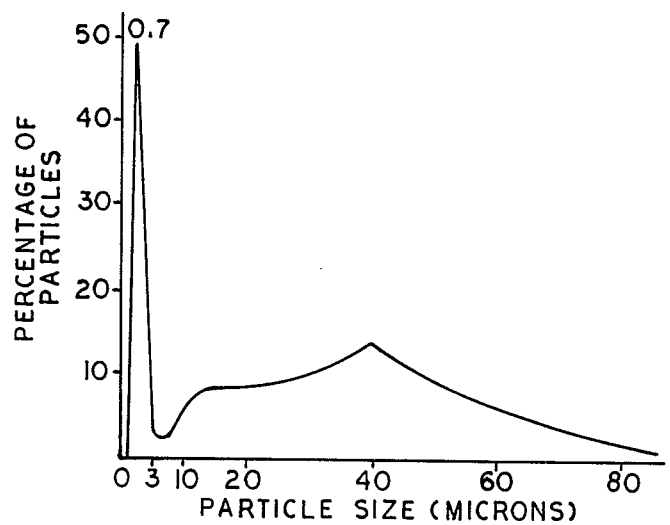
FIG. 3 is a graph showing the particle size distribution curve in combustion gasses from a coal fired combustor which have passed through two highly efficient centrifugal particle separators in series.

One reason for the improved operating efficiency of the filter may be better understood from a reference to FIGS. 2 and 3. FIG. 2 is a graph illustrating the particle size distribution in the base stream entering the first centrifugal separator 10, and FIG. 3 is a similar graph illustrating the particle size distribution in the gas stream exiting the second centrifugal separator 12. An examination of these curves of FIGS. 2 and 3, indicates that the gas from the combustor has a relatively small percentage of small size particles whereas after treatment by the two particle separators the percentage of small size particles is high. Actually there is a substantial fraction of solids in the range of 0.15 to 1.9 microns and it is these particles which tend to plug the filter elements. However, when larger particles are blended into the gas entering the filter a particle size distribution similar to that of FIG. 4 can be realized. As a result the finer particles are trapped in the filter cake which builds up on the surfaces of the filter elements and do not penetrate the filter elements in any significant amounts.

Figure 4:
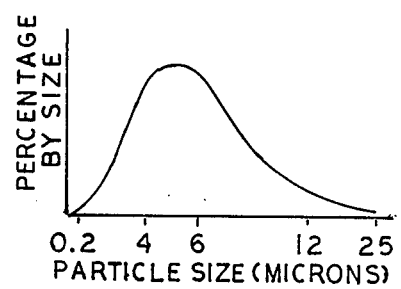
FIG. 4 is a similar graph illustrating the particle size distribution in a gas stream that might be considered ideal for filtration efficiency.

In addition to the blending of particles collected by the separators, particles of one or more reactive materials may be blended with the gas stream entering the filter to provide a particle size distribution similar to that of FIG. 4. The reactive particles will thus react chemically with the gas and also mechanically assist in the filtering operation. For example, where the gas stream contains an objectional amount of corrosive sodium and/or potassium vapors, diatomite or bauxite particles of the proper size may be blended into the gas stream to remove the undesired vapors and to improve the particle size distribution in the gas stream entering the filter. Similarly, powdered lime may be blended with the gas to remove sulfur vapor as well as to adjust the particle size distribution to achieve improved operating efficiency of the filter. In a like manner, other particulate reactive or catalytic materials such as zinc ferrite, copper manganese oxide, nickel based methanation catalyst, nickel based steam reforming catalyst, copper or nickel doped zinc ferrite sorbents, alundum, silica gel and attapulgas clay may be blended with the gas prior to its entering the filter 14.

Referring to FIG. 1 it may be seen that the bottoms of the separators 10 and 12 and another source of particles 16 are connected to a distribution valve 18 through which particles are supplied to a blender 20 to which the gas outlet from the separator 12 is connected. The valve 18 may be adjustable for setting the rate at which the selected particulate matter from any one or all of the separators 10 and 12 and the source 16 is added to the gas stream.

While the present invention has been described in connection with those particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed is:

1. A process for removing fine particulates from a stream of hot gas in which said particulates are entrained, comprising the steps of:
   1. passing said hot gas through a centrifugal separator to remove a fraction of said particulates therefrom,
   2. blending a fraction of said particulates removed by said separator back into said hot gas downstream of said separator, and then
   3. passing said hot gas through a porous filter medium, said medium having a mean pore size larger than said fine particulates entrained in said hot gas.

2. A process for removing entrained particulates from a gas stream, said particulates varying in size between 0.15 microns and 250 microns and having a size distribution in the shape of a bell curve, comprising the steps of:
   1. removing from said hot gas a majority of the larger size particulates entrained in said gas while leaving a majority of the smaller size particulates in said gas, then
   2. mixing with said gas particulates having an average size greater than said smaller size
   3. passing said gas through a porous filter medium having a pore size exceeding the size of said smaller size particulates to remove said smaller size particulates from said gas.

3. A process according to claim 2 wherein said gas particulates having an average size greater than said smaller size particulates comprise reactive material selected from the group consisting of diatomite, bauxite, lime, dolomite, zinc ferrite, copper manganese oxide, nickel based methanation catalyst, nickel based steam reforming catalyst, copper or nickel doped zinc ferrite sorbents, alundum, silica gel and attapulgas clay.

4. Apparatus for removing particulates entrained in a stream of hot gas, comprising in combination
   a centrifugal separator having a gas inlet, a gas outlet, and a second outlet for particulates separated from the gas passing through said separator,
   means for mixing particles from said second outlet with gas from said gas outlet,
   filter means having a gas inlet and a gas outlet for removing particulates from gas supplied to said gas inlet, and
   means connecting the gas from said mixing means to said gas inlet of said filter means.

* * * * *